United States Patent
Ko et al.

(10) Patent No.: US 10,830,342 B2
(45) Date of Patent: Nov. 10, 2020

(54) LINE PRESSURE CONTROL METHOD FOR DUAL-CLUTCH TRANSMISSION

(71) Applicants: Hyundai Motor Company, Seoul (KR); Kia Motors Corporation, Seoul (KR)

(72) Inventors: Young Ho Ko, Yongin-si (KR); Hwa Young Lee, Hwaseong-si (KR); Young Min Yoon, Hwaseong-si (KR); Jin Sung Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/539,147

(22) Filed: Aug. 13, 2019

(65) Prior Publication Data
US 2020/0325985 A1    Oct. 15, 2020

(30) Foreign Application Priority Data

Apr. 9, 2019    (KR) .................... 10-2019-0041331

(51) Int. Cl.
*F16H 61/00*    (2006.01)
*B60W 10/113*    (2012.01)

(52) U.S. Cl.
CPC ....... *F16H 61/0031* (2013.01); *B60W 10/113* (2013.01); *F16H 2061/0093* (2013.01)

(58) Field of Classification Search
None
See application file for complete search history.

(56) References Cited

U.S. PATENT DOCUMENTS

| | | | |
|---|---|---|---|
| 6,692,402 B2 * | 2/2004 | Nakamori | F16H 61/0031 477/3 |
| 7,314,425 B2 * | 1/2008 | Ito | B60W 10/06 477/5 |
| 7,958,983 B2 * | 6/2011 | Schiele | F16D 25/123 192/85.61 |
| 2013/0330216 A1 * | 12/2013 | Yoshida | F04B 17/03 417/410.1 |

FOREIGN PATENT DOCUMENTS

KR    10-2016-0049283 A    5/2016

OTHER PUBLICATIONS

Thornton et al. "Hydraulic Clutch Modeling for Automotive Control," *52nd IEEE Conference on Decision and Control*, pp. 2828-2833 (2013).

\* cited by examiner

*Primary Examiner* — Dirk Wright
(74) *Attorney, Agent, or Firm* — Morgan, Lewis & Bockius LLP

(57) ABSTRACT

A line pressure control method for a dual-clutch transmission (DCT), may include a hydraulic-pressure-decreasing operation of interrupting, by a controller, the supply of current to an electric oil pump and estimating a decrease in a line pressure using a line pressure model based on a pressure accumulator mounted in a hydraulic pressure line, a pump-driving operation of, when the estimated line pressure is equal to or less than a predetermined lower-limit value, driving, by the controller, the electric oil pump, and a hydraulic-pressure-increasing operation of determining, by the controller, the line pressure based on the current supplied to the electric oil pump and to determine whether the determined line pressure is equal to or greater than a predetermined upper-limit value.

8 Claims, 3 Drawing Sheets

LINE PRESSURE CONTROL METHOD FOR DUAL-CLUTCH TRANSMISSION

CROSS-REFERENCE TO RELATED APPLICATION

The present application claims priority to Korean Patent Application No. 10-2019-0041331, filed on Apr. 9, 2019, the entire contents of which is incorporated herein for all purposes by this reference.

BACKGROUND OF THE INVENTION

Field of the Invention

The present invention relates to a line pressure control method for a dual-clutch transmission (DCT), and more particularly to a technology of controlling an electric oil pump to generate a line pressure.

Description of Related Art

In the case in which two clutches used in a dual-clutch transmission (DCT) are implemented as wet multi-plate clutches, it is required to stably supply hydraulic pressure for driving the two clutches.

To achieve stable supply of hydraulic pressure, it is desirable to minimize unnecessary energy consumption. Furthermore, it is desirable to minimize the use of a hydraulic pressure sensor, thus reducing costs.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a line pressure control method for a dual-clutch transmission (DCT), which may minimize the use of a hydraulic pressure sensor when generating hydraulic pressure to be provided to hydraulic multi-plate clutches for the DCT, reducing costs.

Various aspects of the present invention are directed to providing a line pressure control method for a DCT, which may minimize energy consumption for generating hydraulic pressure, improving fuel efficiency and increasing a distance that a vehicle is configured for traveling.

It is a further object of the present invention to provide a line pressure control method for a DCT, which may secure stable supply of hydraulic pressure required for control of the clutches.

In accordance with an aspect of the present invention, the above and other objects may be accomplished by the provision of a method of controlling a line pressure for a dual-clutch transmission (DCT), the method including a hydraulic-pressure-decreasing operation of interrupting, by a controller, the supply of current to an electric oil pump and estimating a decrease in a line pressure using a line pressure model based on a pressure accumulator mounted in a hydraulic pressure line, a pump-driving operation of, when the estimated line pressure is equal to or less than a predetermined lower-limit value, driving, by the controller, the electric oil pump, and a hydraulic-pressure-increasing operation of determining, by the controller, the line pressure based on the current supplied to the electric oil pump and to determine whether the determined line pressure is equal to or greater than a predetermined upper-limit value, wherein, when the determined line pressure is equal to or greater than the upper-limit value, the controller performs the hydraulic-pressure-decreasing operation.

The method may further include a condition determination operation of determining, by the controller, pressure measurability conditions under which the controller measures the line pressure while applying hydraulic pressure to a non-driving-side clutch during the execution of the hydraulic-pressure-decreasing operation, and a model-learning operation of, when the pressure measurability conditions are satisfied, measuring, by the controller the line pressure while applying hydraulic pressure to the non-driving-side clutch to learn a parameter of the line pressure model.

The line pressure model may be expressed using the following equation:

$$p_L = B_1 e^{-k_1 t} + B_2$$

where $p_L$ denotes the line pressure, $$B_1 = \frac{c}{A} B,$$

c denotes a gas spring constant of the pressure accumulator,
A denotes an area of a piston of the pressure accumulator, $$B = \frac{x_L}{e^{-k_1 t}},$$

$x_L$ denotes a displacement of the piston of the pressure accumulator,
$k_1$ denotes the parameter, and
$B_2$ denotes a pressure at which a displacement of the piston starts to occur due to a compression pressure of the pressure accumulator.

In the model-learning operation, the parameter $k_1$ may be determined by putting the measured line pressure and an inclination at which the line pressure is decreased into the following equation, obtained by differentiating the line pressure model with respect to time:

$$-k_1 = \frac{\dot{p}_L}{B_1 e^{-k_1 t}}$$

and into the line pressure model, and
if a new value of the parameter $k_1$ is greater than a parameter of a previous cycle, the line pressure model may be updated using the new value of the parameter $k_1$.

In accordance with another aspect of the present invention, there is provided a method of estimating a decrease in a line pressure, the method including estimating, by the controller, a decrease in a line pressure due to stoppage of an electric oil pump, using a line pressure model based on the operation of a pressure accumulator mounted in a hydraulic pressure line, determining, by the controller, whether pressure measurability conditions under which the controller measures the line pressure while applying hydraulic pressure to a non-driving-side clutch during a decrease in the line pressure are satisfied, and measuring, upon determining that the pressure measurability conditions are satisfied, by the controller, the line pressure while applying hydraulic pressure to the non-driving-side clutch to update the line pressure model.

When the line pressure decreases to a predetermined lower-limit value or less, the controller may increase the line pressure by driving the electric oil pump.

The line pressure model may be expressed using the following equation:

$$p_L = B_1 e^{-k_1 t} + B_2$$

where $p_L$ denotes the line pressure, $$B_1 = \frac{c}{A} B,$$

c denotes a gas spring constant of the pressure accumulator,

A denotes an area of a piston of the pressure accumulator, $$B = \frac{x_L}{e^{-k_1 t}},$$

$x_L$ denotes a displacement of the piston of the pressure accumulator, $k_1$ denotes a parameter, and $B_2$ denotes a pressure at which a displacement of the piston starts to occur due to a compression pressure of the pressure accumulator.

The controller may be configured to determine the parameter $k_1$ by putting the measured line pressure and an inclination at which the line pressure is decreased into the following equation, obtained by differentiating the line pressure model with respect to time:

$$-k_1 = \frac{\dot{p}_L}{B_1 e^{-k_1 t}}$$

and into the line pressure model, if a new value of the parameter $k_1$ is greater than a parameter of a previous cycle, the controller may update the line pressure model using the new value of the parameter $k_1$, and if the new value of the parameter $k_1$ is equal to or less than the parameter of the previous cycle, the controller may maintain the line pressure model using the parameter of the previous cycle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
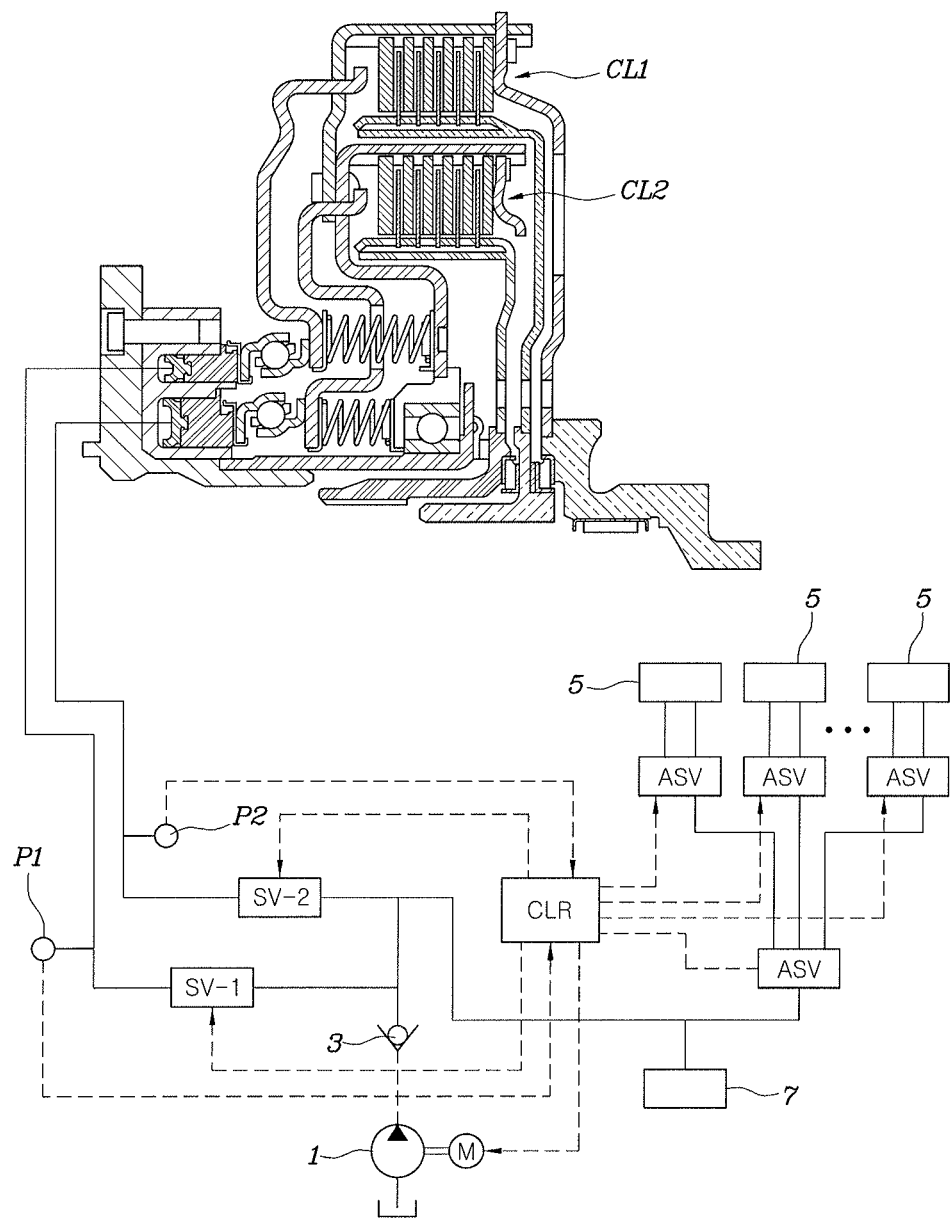
FIG. 1 is a view showing the construction of a hydraulic pressure supply system for a dual-clutch transmission (DCT) to which an exemplary embodiment of the present invention is applicable.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like parts.

Referring to FIG. 1, an oil pump 1 is an electric oil pump, which is driven by a motor M. The motor M is controlled by a controller CLR using a control method to be described later.

The oil pumped by the oil pump 1 passes through a check valve 3, and flows to two clutches CL1 and CL2, which form a dual-clutch transmission (DCT), via two solenoid valves SV-1 and SV-2, respectively. The pressure of the oil supplied to each of the clutches is measured by a corresponding one of hydraulic pressure sensors P1 and P2, which are separately provided.

Each of the two clutches CL1 and CL2 is a multi-plate clutch, which includes a plurality of plates and discs. As the pressure applied by a piston in a response to the hydraulic pressure supplied thereto is increased, the torque transmitted to each clutch is increased.

It is not necessary to provide a separate pressure sensor for measuring a line pressure formed between the check valve 3 and the two solenoid valves SV-1 and SV-2. The line pressure is provided to drive a plurality of actuators 5 for shifting gears in the DCT. The line pressure is kept constant using a pressure accumulator 7.

The actuators 5 are controlled by separate solenoid valves, which are controlled by the controller CLR. The solenoid valves for controlling the actuators 5 are denoted by "ASV" in FIG. 1 to distinguish the same from the solenoid valves SV-1 and SV-2 for controlling the clutches.

Figure 2:
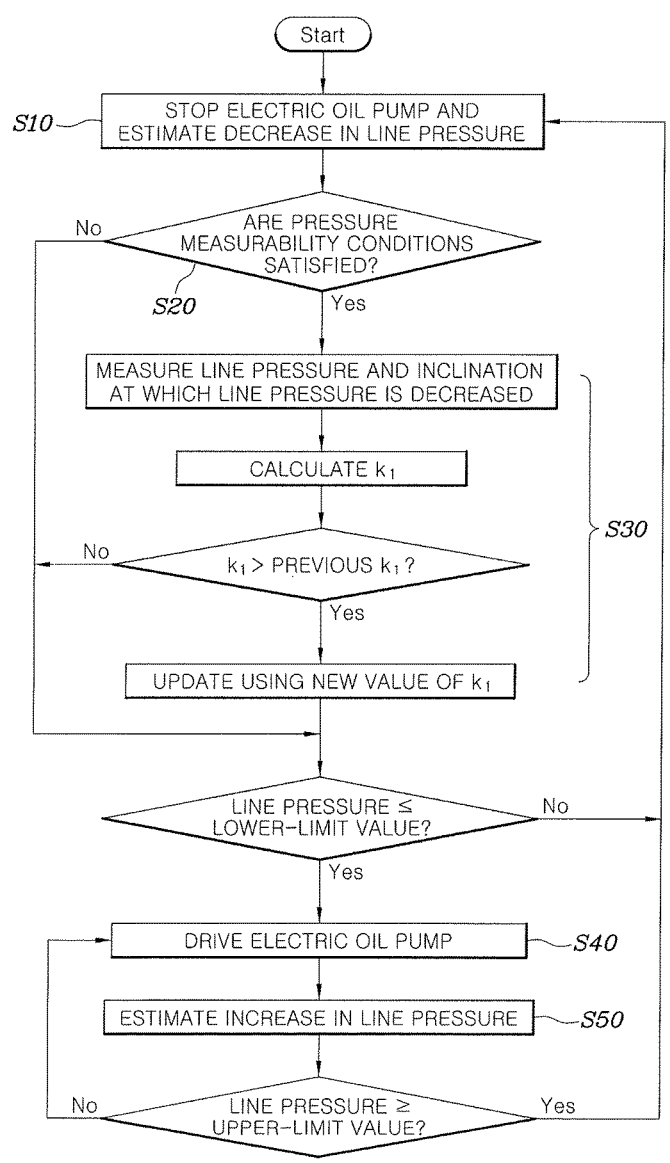
FIG. 2 is a flowchart showing a line pressure control method for a dual-clutch transmission (DCT) according to an exemplary embodiment of the present invention.

Referring to FIG. 2, a line pressure control method for a dual-clutch transmission (DCT) according to an exemplary embodiment of the present invention includes a hydraulic-pressure-decreasing step (S10) of causing the controller to interrupt the supply of current to the electric oil pump and estimating a decrease in a line pressure using a line pressure model based on the pressure accumulator mounted in the hydraulic pressure line, a pump-driving step (S40) of, when the estimated line pressure is equal to or less than a predetermined lower-limit value, driving, by the controller, the electric oil pump, and a hydraulic-pressure-increasing step (S50) of determining, by the controller, the line pressure based on the current supplied to the electric oil pump and to determine whether the determined line pressure is equal to or greater than a predetermined upper-limit value.

When the determined line pressure is equal to or greater than the upper-limit value, the controller performs the hydraulic-pressure-decreasing step (S10). That is, the hydraulic-pressure-decreasing step (S10), the pump-driving step (S40) and the hydraulic-pressure-increasing step (S50) are repeatedly performed.

The line pressure control method for a dual-clutch transmission (DCT) according to the exemplary embodiment of the present invention further includes a condition determination step (S20) of determining, by the controller, pressure measurability conditions under which the controller measures the line pressure while applying hydraulic pressure to a non-driving-side clutch during the execution of the hydraulic-pressure-decreasing step (S10), and a model-learning step (S30) of, when the pressure measurability conditions are satisfied, measuring, by the controller the line pressure while applying hydraulic pressure to the non-driving-side clutch to learn a parameter of the line pressure model.

The line pressure model may be expressed using the following equation:

$$p_L = B_1 e^{-k_1 t} + B_2$$

where $p_L$: line pressure, $$B_1 = \frac{c}{A} B,$$

c: gas spring constant of pressure accumulator,
A: area of piston of pressure accumulator, $$B = \frac{x_L}{e^{-k_1 t}},$$

$x_L$: displacement of piston of pressure accumulator,
$k_1$: parameter, and
$B_2$: pressure at which displacement of piston starts to occur due to compression pressure of pressure accumulator.

Figure 3:
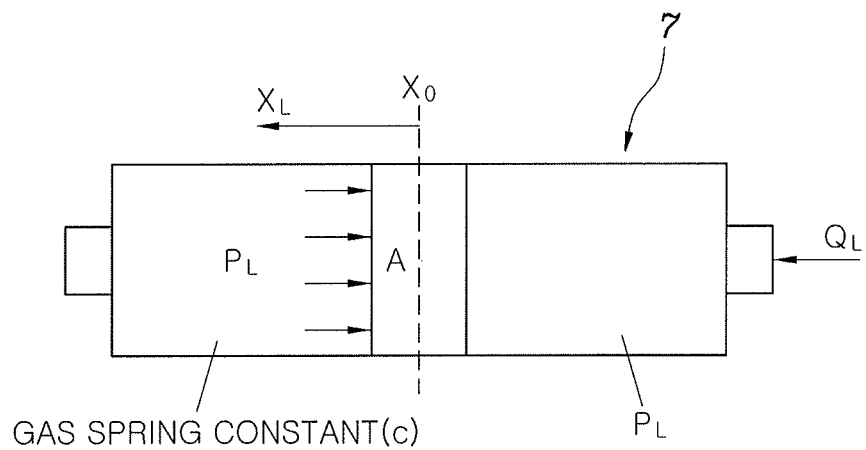
FIG. 3 is a view showing a pressure accumulator model based on which a line pressure model according to an exemplary embodiment of the present invention is implemented.

Referring to the pressure accumulator model shown in FIG. 3, the pressure accumulator is a gas-piston-type pressure accumulator, in which a piston moves to compress gas to accumulate a pressure. The line pressure $p_L$ is proportional to the displacement $x_L$ of the piston.

Here, the relationship between $p_L$ and $x_L$ may be expressed as follows:

$$p_L = \frac{c x_L}{A}$$

where c denotes the gas spring constant of the pressure accumulator.

Since the cross-sectional area A of the pressure accumulator is constant, the displacement $x_L$ of the piston is proportional to the consumed flow rate of the pressure accumulator. This may be expressed using the following equation:

$$\dot{x}_L = -\frac{Q_L}{A}$$

where $Q_L$ denotes the consumed flow rate of the pressure accumulator.

The flow rate consumption of the pressure accumulator occurs in a form of laminar flow and turbulent flow. On the assumption that the flow rate consumption of the pressure accumulator occurs primarily in a laminar-flow form, the consumed flow rate of the pressure accumulator may be simply expressed as follows:

$$Q_L = a_1 p_L = a_1 \frac{c x_L}{A}$$

where $a_1$ denotes the laminar flow coefficient, which includes state information related to a decrease in the line pressure, such as the viscosity of the fluid stored in the pressure accumulator, the flow rate coefficient, and the cross-sectional area of the path. Here, the cross-sectional area of the path is the cross-sectional area at the point from which the fluid leaks to decrease the line pressure. The cross-sectional area of the path includes the area of a gap, which is formed depending on the state in which a check ball of the check valve is accommodated on the valve seat or due to manufacturing tolerance of the valves used in the system.

The laminar flow model and the turbulent flow model of the consumed flow rate of the pressure accumulator are based on a reference document (Sarah Thornton, Gregory M. Pietron, Diana Yanakiev, James McCallum, Anuradha Annaswamy "Hydraulic Clutch Modeling for Automotive Control", 52$^{nd}$ IEEE Conference on Decision and Control December 10 to 13, 2013).

Through a combination of the above equations, it is possible to obtain the following equation.

$$\dot{x}_L = -\frac{Q_L}{A} = -\frac{a_1 c x_L}{A^2}$$

From the present equation, it is possible to obtain the following differential equation.

$$\dot{x}_L + \frac{a_1 c x_L}{A^2} = 0$$

Here, if $$\frac{a_1 c}{A^2} = k_1$$

is applied to the present equation, it is possible to obtain the following equation.

$$x_L = B e^{-k_1 t}$$

If $$p_L = \frac{cx_L}{A}$$

is applied to the present equation, it is possible to obtain the following equation.

$$p_L = \frac{c}{A} B e^{-k_1 t}$$

If $$\frac{c}{A} B = B_1$$

is applied to the present equation, it is possible to obtain the following equation.

$$p_L = B_1 e^{-k_1 t}$$

If the pressure $B_2$ at which the displacement of the piston starts to occur due to the compression pressure of the pressure accumulator is added to the present equation, it is possible to obtain the final line pressure model as follows.

$$p_L = B_1 e^{-k_1 t} + B_2$$

The controller estimates the line pressure which is decreased after the electric oil pump is turned off based on the line pressure model as described above, and performs the condition determination step (S20) and the model-learning step (S30).

In the condition determination step (S20), the pressure measurability conditions are the conditions under which the non-driving-side clutch, which is not being used to transmit power to the driving wheels, is predicted not to be used for a while. For example, the pressure measurability conditions may be the conditions under which it is determined that shifting is not likely to occur for a while because the state in which the amount of depression of the accelerator pedal is equal to or less than a predetermined level is maintained for a predetermined time period. During conventional clutch touch-point learning, the pressure measurability conditions may be satisfied, and thus the model-learning step (S30) may be performed simultaneously with the clutch touch-point learning.

In the model-learning step (S30), it is possible to obtain the equation $\dot{p}_L = -k_1 B_1 e^{-k_1 t}$ by differentiating the line pressure model with respect to time. from the present equation, it is possible to obtain the following equation.

$$-k_1 = \frac{\dot{p}_L}{B_1 e^{-k_1 t}}$$

Figure 4:
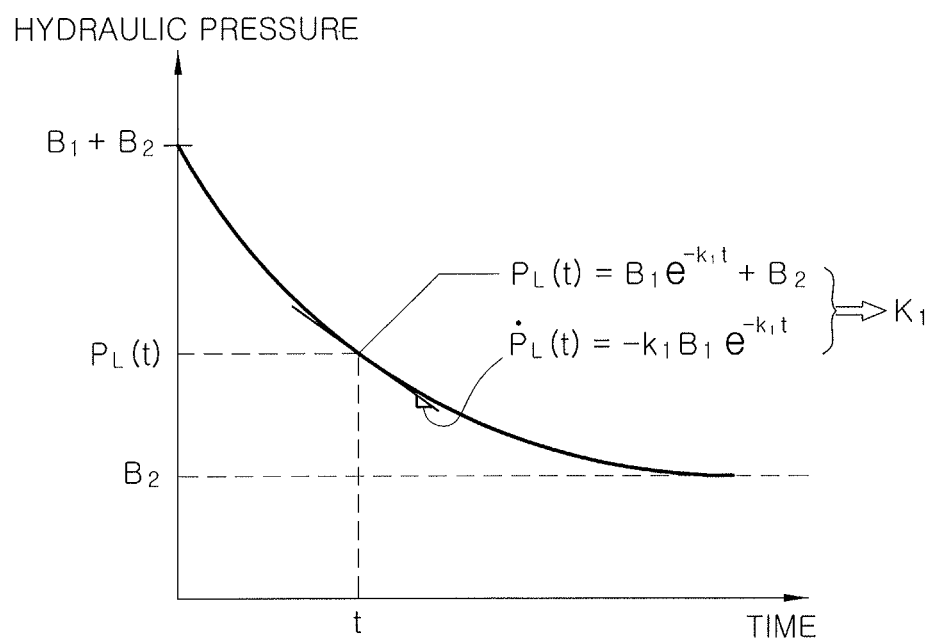
FIG. 4 is a graph showing a hydraulic-pressure-decreasing process according to an exemplary embodiment of the present invention.

Here, it is possible to determine the value of the parameter $k_1$ by inputting the change rate of the line pressure, measured while applying hydraulic pressure to the non-driving-side clutch, to $\dot{p}_L$, inputting the line pressure $p_L$, measured while applying hydraulic pressure to the non-driving-side clutch, to the equation $p_L = B_1 e^{-k_1 t} + B_2$, and inputting a value, determined in advance through experiments, to $B_2$ (refer to FIG. 4).

If the new value of the parameter $k_1$ is greater than the value of the parameter of the previous cycle, the controller updates the line pressure model using the new value of the parameter $k_1$, but if not, the controller maintains the line pressure model using the previous value of the parameter $k_1$.

Because the parameter $k_1$ includes the laminar flow coefficient $a_1$, the parameter $k_1$ needs to be appropriately set so that various unpredictable changes in the state of the hydraulic pressure circuit, which have an influence on the line pressure, are reflected in the line pressure model.

If the parameter $k_1$ is gradually increased and thus the line pressure model is continuously updated using a larger parameter $k_1$, for example, after the electric oil pump is stopped, the check ball of the check valve may not be properly accommodated on the valve seat, and accordingly, the line pressure may be excessively decreased. However, the present invention is configured for learning the present phenomenon in real time and updating the line pressure model, maintaining stable line pressure at all times.

When the line pressure estimated by the line pressure model is equal to or less than a predetermined lower-limit value, the controller performs the pump-driving step (S40) of driving the electric oil pump and the hydraulic-pressure-increasing step (S50) of determining the line pressure based on the current supplied to the electric oil pump and determining whether the determined line pressure is equal to or greater than a predetermined upper-limit value.

The method of determining the line pressure based on the current supplied to the electric oil pump may be implemented using the following law of physics.

$$W \text{ (power)} = V \text{ (voltage)} * i \text{ (current)} = T \text{ (torque)} * \omega \text{ (angular speed)} = P \text{ (hydraulic pressure)} * Q \text{ (flow rate)}$$

Here, if the temperature of the fluid is constant and the oil pump is driven at a regular speed, the power of the motor driving the oil pump is constant. Furthermore, since the flow rate is constant if the angular speed of the oil pump is constant, if the voltage of the motor driving the oil pump is constant, the pressure is proportional to the current of the motor driving the oil pump.

The upper-limit value and the lower-limit value are reference values used to maintain the target line pressure. The maximum hydraulic pressure and the minimum hydraulic pressure, between which the valves and the clutches operate properly in the hydraulic pressure supply system, may be set as the upper-limit value and the lower-limit value, respectively.

Meanwhile, aside from a technology for increasing the line pressure by driving the electric oil pump, various aspects of the present invention are directed to providing another example of technology for estimating a decrease in a line pressure after the electric oil pump is turned off. A method of estimating a decrease in a line pressure according to an exemplary embodiment of the present invention may include a step of estimating, by the controller, a decrease in a line pressure due to the stoppage of an electric oil pump, using a line pressure model based on the operation of a pressure accumulator mounted in a hydraulic pressure line, a step of determining, by the controller, whether pressure measurability conditions under which the controller measures the line pressure while applying hydraulic pressure to a non-driving-side clutch during the decrease in the line pressure are satisfied, and a step of measuring, upon determining that the pressure measurability conditions are satisfied, by the controller, the line pressure while applying hydraulic pressure to the non-driving-side clutch to update the line pressure model.

Of course, the line pressure model and the line-pressure-model-learning method are the same as described above.

As is apparent from the above description, various aspects of the present invention are directed to providing a line pressure control method for a DCT, which may minimize the use of a hydraulic pressure sensor when generating hydraulic pressure to be provided to hydraulic multi-plate clutches for the DCT, reducing costs.

Furthermore, it is possible to minimize energy consumption for generating hydraulic pressure, improving fuel efficiency and increasing a distance that a vehicle is configured for traveling.

Furthermore, it is possible to secure stable supply of hydraulic pressure required for control of the clutches.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling a line pressure for a dual-clutch transmission (DCT), the method comprising:
   a hydraulic-pressure-decreasing operation of interrupting, by a controller, a supply of current to an electric oil pump and estimating the line pressure which is decreased using a line pressure model based on a pressure accumulator mounted in a hydraulic pressure line;
   a pump-driving operation of, in a response that the estimated line pressure is equal to or less than a predetermined lower-limit value, driving, by the controller, the electric oil pump to increase the line pressure; and
   a hydraulic-pressure-increasing operation of determining, by the controller, the line pressure based on the current supplied to the electric oil pump and determining when the determined line pressure is equal to or greater than a predetermined upper-limit value,
   wherein, in a response that the determined line pressure is equal to or greater than the predetermined upper-limit value, the controller is configured to perform the hydraulic-pressure-decreasing operation.

2. The method according to claim 1, further including:
   a condition determination operation of determining, by the controller, pressure measurability conditions under which the controller measures the line pressure while applying hydraulic pressure to a non-driving-side clutch during execution of the hydraulic-pressure-decreasing operation; and
   a model-learning operation of, in a response that the pressure measurability conditions are satisfied, measuring, by the controller, the line pressure while applying hydraulic pressure to the non-driving-side clutch to learn a parameter of the line pressure model.

3. The method according to claim 2, wherein the line pressure model is expressed using a following equation:

$$p_L = B_1 e^{-k_1 t} + B_2$$

where $p_L$ denotes the line pressure, $$B_1 = \frac{c}{A} B,$$

c denotes a gas spring constant of the pressure accumulator,
A denotes an area of a piston of the pressure accumulator, $$B = \frac{x_L}{e^{-k_1 t}},$$

$x_L$ denotes a displacement of the piston of the pressure accumulator,
$k_1$ denotes the parameter, and
$B_2$ denotes a pressure at which a displacement of the piston starts to occur due to a compression pressure of the pressure accumulator.

4. The method according to claim 3, wherein in the model-learning operation,
   the parameter $k_1$ is determined by putting the measured line pressure and an inclination at which the line pressure is decreased into a following equation, obtained by differentiating the line pressure model with respect to time:

$$-k_1 = \frac{\dot{p}_L}{B_1 e^{-k_1 t}}$$

and into the line pressure model, and
wherein, in a response that a new value of the parameter $k_1$ is greater than a parameter of a previous cycle, the line pressure model is updated using the new value of the parameter $k_1$.

5. A method of estimating a decrease in a line pressure, the method including:
   estimating, by a controller, the line pressure which is decreased due to stoppage of an electric oil pump, using a line pressure model based on operation of a pressure accumulator mounted in a hydraulic pressure line;
   determining, by the controller, when pressure measurability conditions under which the controller measures the line pressure while applying hydraulic pressure to a non-driving-side clutch during a decrease in the line pressure are satisfied; and
   measuring, in a response of determining that the pressure measurability conditions are satisfied, by the controller, the line pressure while applying hydraulic pressure to the non-driving-side clutch to update the line pressure model.

6. The method according to claim 5, wherein, in a response that the line pressure decreases to a predetermined lower-limit value or less, the controller is configured to increase the line pressure by driving the electric oil pump.

7. The method according to claim 5, wherein the line pressure model is expressed using a following equation:

$$p_L = B_1 e^{-k_1 t} + B_2$$

where $p_L$ denotes the line pressure, $$B_1 = \frac{c}{A} B,$$

c denotes a gas spring constant of the pressure accumulator,
A denotes an area of a piston of the pressure accumulator, $$B = \frac{x_L}{e^{-k_1 t}},$$

$x_L$ denotes a displacement of the piston of the pressure accumulator,
$k_1$ denotes a parameter, and
$B_2$ denotes a pressure at which a displacement of the piston starts to occur due to a compression pressure of the pressure accumulator.

8. The method according to claim 7, wherein the controller is configured to determine the parameter $k_1$ by putting the measured line pressure and an inclination at which the line pressure is decreased into a following equation, obtained by differentiating the line pressure model with respect to time:

$$-k_1 = \frac{\dot{p}_L}{B_1 e^{-k_1 t}}$$

and into the line pressure model,
wherein, in a response that a new value of the parameter $k_1$ is greater than a parameter of a previous cycle, the controller is configured to update the line pressure model using the new value of the parameter $k_1$, and
wherein, in a response that the new value of the parameter $k_1$ is equal to or less than the parameter of the previous cycle, the controller is configured to maintain the line pressure model using the parameter of the previous cycle.

* * * * *